(12) United States Patent
Muddiman et al.

(10) Patent No.: US 9,657,751 B2
(45) Date of Patent: May 23, 2017

(54) PNEUMATIC PRESSURE BRAKE BOOSTER SYSTEM

(71) Applicant: Ford Global Technologies, LLC, Dearborn, MI (US)

(72) Inventors: Mark Warren Muddiman, Belleville, MI (US); Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 699 days.

(21) Appl. No.: 13/708,964

(22) Filed: Dec. 8, 2012

(65) Prior Publication Data

US 2014/0157979 A1   Jun. 12, 2014

(51) Int. Cl.
*B60T 13/44* (2006.01)
*F15B 7/00* (2006.01)
*B60T 13/52* (2006.01)

(52) U.S. Cl.
CPC ............... *F15B 7/00* (2013.01); *B60T 13/44* (2013.01); *B60T 13/52* (2013.01)

(58) Field of Classification Search
CPC ........................................................ B60T 13/44
See application file for complete search history.

(56) References Cited

U.S. PATENT DOCUMENTS

| | | | |
|---|---|---|---|
| 3,090,650 A * | 5/1963 | Stelzer | 303/9.69 |
| 4,199,951 A | 4/1980 | Horie | |
| 4,633,757 A * | 1/1987 | Kubota | B60T 13/246 303/114.3 |
| 5,839,887 A * | 11/1998 | Duret | B60T 13/44 417/364 |
| 2009/0115245 A1 | 5/2009 | Attard | |
| 2010/0005796 A1 | 1/2010 | Schonlau et al. | |

* cited by examiner

*Primary Examiner* — F. Daniel Lopez
(74) *Attorney, Agent, or Firm* — David Kelley, Esq.; Tung & Associates

(57) ABSTRACT

A pneumatic pressure brake booster system includes an air pressure chamber; an ambient air chamber; a flexible diaphragm separating the air pressure chamber and the ambient air chamber; at least one air pressure source communicating with the air pressure chamber; a brake pedal shaft engaged by and movable with the diaphragm; and a brake master cylinder engaged by the brake pedal shaft.

12 Claims, 2 Drawing Sheets

PNEUMATIC PRESSURE BRAKE BOOSTER SYSTEM

FIELD

The disclosure generally relates to automotive brake boosters. More particularly, the disclosure relates to an automotive pressure brake booster system which imparts assist forces to a brake system using a pressure servo booster instead of a vacuum booster, and a pneumatic pressure brake booster method.

BACKGROUND

Vacuum boosters are commonly used to boost the brake pressure of automotive braking systems. However, vacuum boosters may not be suitable for some vehicles such as those with turbocharged or supercharged engines, engines with stop-start features, gas-electric hybrids and electric powertrains. Therefore, an external auxiliary vacuum pump may be required for these applications. The vacuum pump performance is limited to some fraction of the ambient air pressure and may be severely limited at high altitudes. Moreover, large vacuum boosters may be required to achieve high assist forces in an ever-decreasing package space for smaller vehicles.

Accordingly, an automotive pressure brake booster system and method in which assist forces are imparted to a brake system using a pressure servo booster instead of a vacuum booster may be desirable for some applications.

SUMMARY

The disclosure is generally directed to a pneumatic pressure brake booster system. An illustrative embodiment of the system includes an air pressure chamber; an ambient air chamber; a flexible diaphragm separating the air pressure chamber and the ambient air chamber; at least one air pressure source communicating with the air pressure chamber; a brake pedal shaft engaged by and movable with the diaphragm; and a brake master cylinder engaged by the brake pedal shaft.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
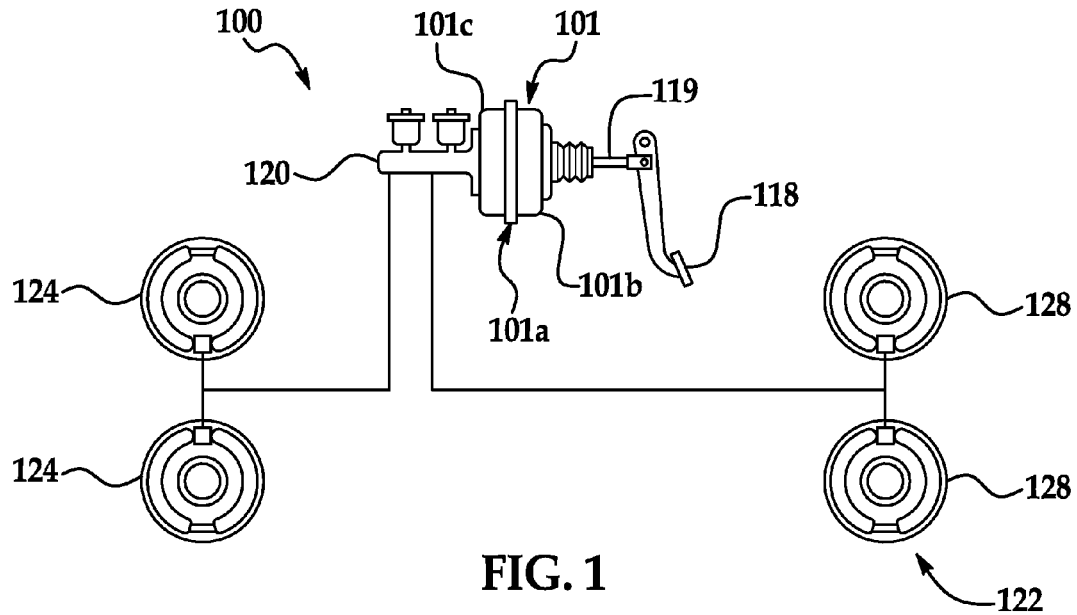
FIG. 1 is a schematic diagram illustrating an illustrative embodiment of the pneumatic pressure brake booster system connected to front and rear brakes of an automotive braking system.
Figure 2:
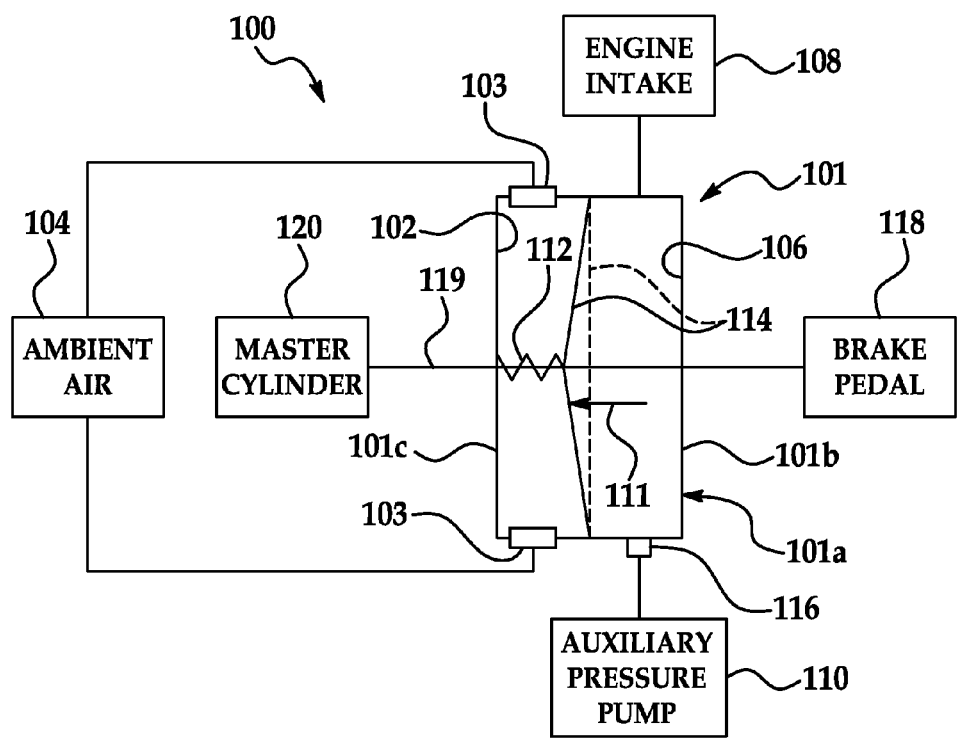
FIG. 2 is a schematic block diagram of an illustrative embodiment of the pneumatic pressure brake booster system.

Referring initially to FIGS. 1 and 2 of the drawings, an illustrative embodiment of the pneumatic pressure brake booster system, hereinafter system, is generally indicated by reference numeral 100. As shown in FIG. 1, the system 100 may be adapted for connection to a vehicle braking system 122 of a vehicle (not shown) having a pair of front brakes 124 and a pair of rear brakes 128 to operate the front and rear brakes 124, 128. In some applications, the vehicle having the vehicle braking system 122 may have a turbocharged or supercharged engine, an engine with stop-start features or an electric powertrain, or may be a gas-electric hybrid. The system 100 may facilitate enhanced braking capability and higher assist forces generated by the vehicle braking system 122. The system 100 may additionally facilitate enhanced space-efficient packaging of the braking system components in smaller vehicles.

The system 100 includes a pressure servo booster 101. The pressure servo booster 101 may have a design which is similar to that of a standard or conventional vacuum booster which is known by those skilled in the art, with notable exceptions described below. As shown in FIG. 2, the pressure servo booster 101 has a booster shell 101a with a brake pedal side 101b and a brake master cylinder side 101c. The booster shell 101a has an interior air pressure chamber 106 on the brake pedal side 101b and an interior ambient air chamber 102 on the brake master cylinder side 101c. A flexible diaphragm 114 separates the ambient air chamber 102 and the air pressure chamber 106. The diaphragm 114 can be deployed in a pre-deformed position indicated by the phantom lines and a deformed position indicated by the solid lines in FIG. 2. At least one ambient air vent 103 in the booster shell 101a communicates with the ambient air chamber 102. Accordingly, as it is deployed from the pre-deformed position indicated by the phantom lines to the deformed position indicated by the solid lines in FIG. 2, the diaphragm 114 forces ambient air 104 from the ambient air chamber 102 through the ambient air vent or vents 103. Conversely, as the diaphragm 114 returns from the deformed position back to the pre-deformed position, the resulting drop in air pressure draws ambient air 104 into the ambient air chamber 102 through the ambient air vent or vents 103.

At least one source 108, 110 of pressurized air 111 communicates with the air pressure chamber 106. In some embodiments, such as when a turbo-charged or super-charged engine is present, the source of pressurized air 111 may include engine intake air 108 from the engine air intake manifold (not shown) of the vehicle. In some embodiments, the source of pressurized air 111 may include an auxiliary pressure pump 110. In some embodiments, the source of pressurized air 111 may include both engine intake air 108 and an auxiliary pressure pump 110. A hose coupling 116 may detachably couple the auxiliary pressure pump 110 to the air pressure chamber 106.

A brake pedal shaft 119 slidably extends through sealed shaft openings (not shown) in the booster shell 101a. The brake pedal shaft 119 traverses the ambient air chamber 102 and the air pressure chamber 106 of the booster shell 101a. A brake pedal 118 engages a first end of a brake pedal shaft 119. A second end of the brake pedal shaft 119 operably engages a brake master cylinder 120. Responsive to depression of the brake pedal 118, the brake pedal shaft 119 shifts from a pre-actuating position to an actuating position in which the brake pedal shaft 119 actuates the brake master cylinder 120. The diaphragm 114 is attached to the brake pedal shaft 119 such that deformation of the diaphragm 114 into the ambient air chamber 102 augments movement of the brake pedal shaft 119 from the pre-actuating position to the actuating position in actuation of the brake master cylinder 120.

A pedal return spring 112 may be fitted on the brake pedal shaft 119 in the ambient air chamber 102. The pedal return spring 112 may be interposed between the diaphragm 114 and the booster shell 101a. The pedal return spring 112 normally maintains the brake pedal shaft 119 in the pre-actuating position. Upon depression of the brake pedal 118, the pedal return spring 112 is compressed as the brake pedal shaft 119 actuates the brake master cylinder 120. Upon subsequent release of the brake pedal 118, the pedal return spring 112 expands and returns the brake pedal shaft 119 to the pre-actuating position. Simultaneously, the brake pedal shaft 119 returns the diaphragm 114 to the pre-deformed position indicated by the phantom lines in FIG. 2.

In exemplary application of the system 100, the engine intake air 108 and/or the auxiliary pressure pump 110 supplies air pressure 111 to the air pressure chamber 106. The air pressure 111 in the air pressure chamber 106 applies force against the diaphragm 114 and biases the diaphragm 114 toward the ambient air chamber 102. Consequently, upon subsequent depression of the brake pedal 118, the brake pedal shaft 119 is pushed further into the brake master cylinder 120 and actuates the brake master cylinder 120. Hydraulic fluid (not shown) flows from the brake master cylinder 120 to the front brakes 124 and the rear brakes 128 to actuate the brakes 124, 128 in the conventional manner.

As the brake pedal shaft 119 is pushed further into the brake master cylinder 120 upon depression of the brake pedal 118, the air pressure 111 in the air pressure chamber 106 deforms the diaphragm 114 into the ambient air chamber 102, causing ambient air 104 to exit the ambient air chamber 102 through the ambient air vent or vents 103. Consequently, as it is deformed, the diaphragm 114 augments movement of the brake pedal shaft 119 further into the brake master cylinder 120, reducing the magnitude of foot pressure which is required for application to the brake pedal 118 to facilitate actuation of the vehicle braking system 122. This expedient may be particularly advantageous at high altitudes in which the pressure of the ambient air 104 is reduced.

Upon subsequent release of foot pressure from the brake pedal 118, the pedal return spring 112 expands and returns the brake pedal shaft 119 and the brake pedal 118 to the pre-actuating position. The diaphragm 114 returns with the brake pedal shaft 119 to the pre-deformed position indicated by the phantom lines in FIG. 2. Simultaneously, ambient air 104 is drawn back into the ambient air chamber 102 through the ambient air vent or vents 103.

It will be appreciated by those skilled in the art that compared with conventional vacuum boosters, the system 100 facilitates achievement of higher assist forces in smaller package space with brake pedal pressures several times the pressure of the ambient air 104. Air pressure 111 can be supplied from the engine intake air 108 from the engine intake if pressurized, and/or from the auxiliary pressure pump 110. The auxiliary pressure pump 110 can be used to pressurize the chassis suspension, air springs, dampers, etc. In some embodiments, the hose coupling 116 (FIG. 2) can detachably couple the auxiliary pressure pump 110 to the air pressure chamber 106. The auxiliary pressure pump 110 can be selectively uncoupled from the air pressure chamber 106 to enable a customer to inflate tires, toys, etc.

Figure 3:
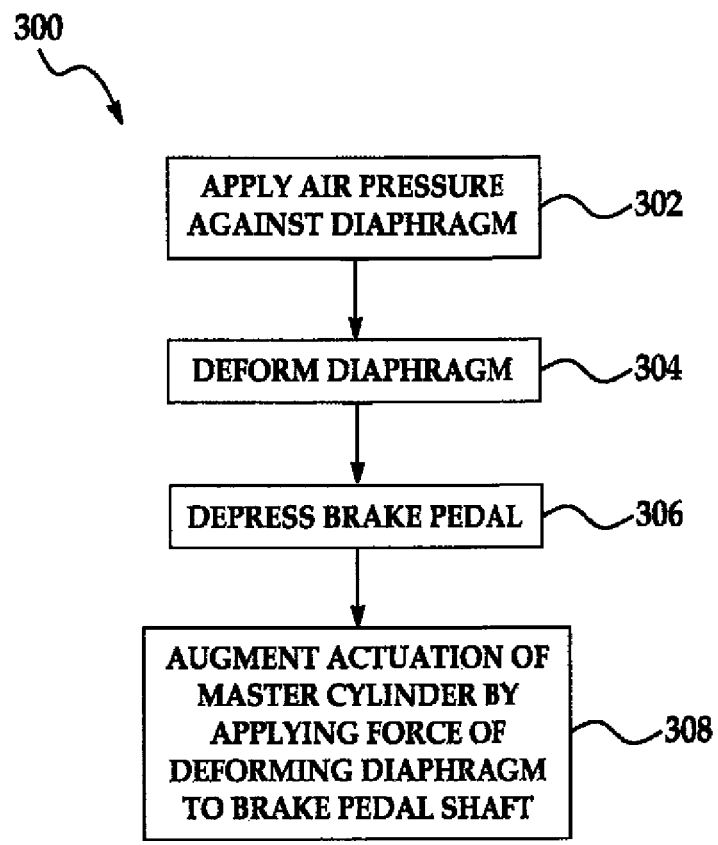
FIG. 3 is a flow diagram of an illustrative embodiment of a pneumatic pressure brake booster method.

Referring next to FIG. 3 of the drawings, a flow diagram 300 of an illustrative embodiment of a pneumatic pressure brake booster method is shown. In block 302, air pressure is applied against a diaphragm. In some embodiments, the air pressure applied against the diaphragm may be from engine intake air. In some embodiments, the air pressure applied against the diaphragm may be from an auxiliary pressure pump. In block 304, the diaphragm is deformed. In block 306, a brake pedal is depressed. In some embodiments, ambient air may be expelled from an ambient air chamber while the diaphragm is deformed. In block 308, actuation of the brake master cylinder is augmented by applying the force of the deforming diaphragm to the brake pedal shaft.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A pneumatic pressure brake booster system comprising a pressure servo booster, the system comprising:
   an air pressure chamber;
   an ambient air chamber; at leas one ambient ar vent communicating with the ambient air chamber; wherein the at least one ambient air vent comprises a plurality of ambient air vents;
   a flexible diaphragm separating and defining a wall of the air pressure chamber and the ambient air chamber;
   at least one air pressure source communicating with the air pressure chamber;
   a one-piece brake pedal shaft attached to and movable with the diaphragm, the brake pedal shaft slideably extending through the air pressure chamber and ambient air pressure chamber, the brake pedal shaft engaged by and moveable in response to movement of a brake pedal; and
   a brake master cylinder engaged by the brake pedal shaft.

2. The system of claim 1 wherein the at least one air pressure source comprises pressurized engine intake air.

3. The system of claim 1 wherein the at least one air pressure source comprises an auxiliary pressure pump.

4. The system of claim 3 further comprising a hose coupling detachably coupling the auxiliary pressure pump to the air pressure chamber.

5. The system of claim 1 wherein the at least one air pressure source communicating with the air pressure chamber comprises a plurality of air pressure sources communicating with the air pressure chamber.

6. The system of claim 5 wherein the plurality of air pressure sources communicating with the air pressure chamber comprises pressurized engine intake air and an auxiliary pressure pump communicating with the air pressure chamber.

7. A pneumatic pressure brake booster system comprising a pressure servo booster, the system comprising:
   a booster shell having a brake pedal side and a brake master cylinder side;
   an air pressure chamber in the booster shell on the brake pedal side;

an ambient air chamber in the booster shell on the brake master cylinder side; at least one ambient air vent communicating with the ambient air chamber; wherein the at least one ambient air vent comprises a plurality of ambient air vents;

a flexible diaphragm separating and defining a wall of the air pressure chamber and the ambient air chamber;

at least one air pressure source communicating with the air pressure chamber;

a one-piece brake pedal shaft attached to and movable with the diaphragm, the brake pedal shaft slideably extending through the air pressure chamber and ambient air pressure chamber, the brake pedal shaft engaged by and moveable in response to movement of a brake pedal; and a brake master cylinder engaged by the brake pedal shaft.

8. The system of claim 7 wherein the at least one air pressure source comprises pressurized engine intake air.

9. The system of claim 7 wherein the at least one air pressure source comprises an auxiliary pressure pump.

10. The system of claim 9 further comprising a hose coupling detachably coupling the auxiliary pressure pump to the air pressure chamber.

11. The system of claim 7 wherein the at least one air pressure source communicating with the air pressure chamber comprises a plurality of air pressure sources communicating with the air pressure chamber.

12. The system of claim 11 wherein the plurality of air pressure sources communicating with the air pressure chamber comprises pressurized engine intake air and an auxiliary pressure pump communicating with the air pressure chamber.

* * * * *